(12) United States Patent
Chang et al.

(10) Patent No.: US 9,533,374 B2
(45) Date of Patent: Jan. 3, 2017

(54) MANUFACTURING METHOD OF A STATOR MODULE OF A FAN

(71) Applicant: ASIA VITAL COMPONENTS CO., LTD., Sinjhuang District, New Taipei (TW)

(72) Inventors: Bor-Haw Chang, New Taipei (TW); Shu-Fan Liu, New Taipei (TW); Kuo-Chen Chang, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 826 days.

(21) Appl. No.: 13/831,324

(22) Filed: Mar. 14, 2013

(65) Prior Publication Data

US 2014/0263210 A1   Sep. 18, 2014

(51) Int. Cl.
| | |
|---|---|
| B23K 26/00 | (2014.01) |
| B23K 26/20 | (2014.01) |
| B23K 26/24 | (2014.01) |
| H02K 1/18 | (2006.01) |
| H02K 15/02 | (2006.01) |

(52) U.S. Cl.
CPC .............. B23K 26/20 (2013.01); B23K 26/24 (2013.01); H02K 1/187 (2013.01); H02K 15/02 (2013.01)

(58) Field of Classification Search
CPC ................ B23K 26/20–26/22; B23K 26/24; B23K 2201/001; H02K 1/187; H02K 15/02
USPC .............. 219/121.6, 121.63, 121.64, 121.78
See application file for complete search history.

(56) References Cited

U.S. PATENT DOCUMENTS

| | | | |
|---|---|---|---|
| 2004/0103533 A1* | 6/2004 | Lundgren | 29/889.21 |
| 2007/0029289 A1* | 2/2007 | Brown | 219/121.6 |
| 2008/0079101 A1* | 4/2008 | Ai | 257/417 |
| 2008/0169722 A1* | 7/2008 | Ho | 310/217 |

FOREIGN PATENT DOCUMENTS

| | | |
|---|---|---|
| CN | 201851378 U | 6/2011 |
| TW | 317321 U | 10/1997 |

* cited by examiner

*Primary Examiner* — Dana Ross
*Assistant Examiner* — Brandon Harvey
(74) *Attorney, Agent, or Firm* — C. G. Mersereau; Nikolai & Mersereau, P.A.

(57) ABSTRACT

A manufacturing method in which laser welding is used to weld multiple posts of a protection structure with multiple splits of the silicon steel sheet assembly of a stator module. The manufacturing method has high welding precision and excellent sealing effect. Also, the welding time is shortened and the thermal deformation is reduced.

8 Claims, 17 Drawing Sheets providing a stator module, the stator module including a silicon steel sheet assembly having a first end, a second end, multiple splits, multiple outer faces and an insulation support assembly, the outer faces being formed between the adjacent splits — 71 providing a first cover body to cover the first end of the silicon steel sheet assembly and contact the insulation support assembly, the first cover body including multiple posts correspondingly inserted in the multiple splits, two sides of the posts respectively contacting two sides of the splits — 72 providing a second cover body to cover the second end of the silicon steel sheet assembly, the posts extending to the second cover body, a third cover body being further provided corresponding to the second cover body in contact with the insulation support assembly — 73 using laser welding to weld the junction between the first cover body and the first end of the silicon steel sheet assembly and the junction between the first cover body and the insulation support assembly and the junction between two sides of the posts and two sides of the splits and the junction between the second cover body and the second end and the junction between the posts and the second cover body and the junction between the third cover body and the second cover body and the junction between the third cover body and the insulation support assembly — 74

Fig. 15

MANUFACTURING METHOD OF A STATOR MODULE OF A FAN

BACKGROUND OF THE INVENTION

1. Field of the Invention

The present invention relates generally to a manufacturing method of a stator module, and more particularly to a stator module with protection structure and a manufacturing method of a fan of the stator module.

2. Description of the Related Art

It is known that various fans are widely applied to all kinds of devices or sites, for example, personal computers, servers, storage devices, communication apparatuses, power supplies, vehicle industries, industrial control instruments, medical equipments, shipping equipments, air-conditioners and other industrial apparatuses.

A conventional fan stator includes a silicon steel sheet assembly, multiple windings, a circuit board and other electronic components. These components are exposed to air in contact with the vapor or dust in the air. Therefore, short-circuit may take place to these components to cause damage thereof due to humidity. In some more serious cases, these components may burn out and fail. This will affect the operation of the electronic device.

Therefore, when applied to various devices and sites, it is necessary to prevent the stator and other electronic components in the fan from humidity and salty fog. Currently, there are four ways to protect the stator and other electronic components as follows:

1. Cover body protection. A cover body is used to enclose and seal the stator so as to prevent the stator structure from direction contact with air. In this case, the stator is isolated from humidity and salty fog. However, in practice, such protection has some shortcomings. The cover body is disposed between the stator and the rotor around the stator. This leads to increase of the distance between the stator and the rotor. That is, the gap between the silicon steel sheet assembly of the stator and the magnet of the rotor is increased. As a result, the magnetization and induction performance will be reduced to affect rotational power of the fan. Furthermore, the stator is sealedly enclosed in the cover body by means of adhesive dispensing or O-ring press fit. The adhesive dispensing process costs long time and it is hard to control the amount of the adhesive so that the adhesive is likely to spill. The lifetime of the O-ring is short. After a period of use, the O-ring tends to crack. Under such circumstance, the humidity and salty fog are easy to infiltrate into the cover body.

2. Cover body and sealing adhesive protection. In order to solve the above problem of the cover body and enhance the sealing performance of the cover body, a sealing adhesive is filled into the cover body to seal the stator and electronic components. However, in practice, such protection still has some shortcomings. The magnetization and induction performance will be still reduced to affect rotational power of the fan. Moreover, it takes long time to wait for solidification of the sealing adhesive. In addition, during solidification process, the adhesive will apply a stress to the electronic components due to thermal change. This is likely to cause malfunction of the electronic components. It is necessary to pay great attention to the surface mount technology (SMT) strength between the electronic components and the circuit board. Moreover, the cover body is positioned in the outermost position. After the sealing adhesive is filled into the cover body, it is impossible to check the condition of the sealing adhesive inside the cover body. In the case of improper filling, bubbles will exist in the adhesive. This leads to probability of infiltration. Moreover, after sealed by the adhesive, the heat dissipation effect of the windings and the silicon steel sheets and electronic components of the stator will be deteriorated. This will cause rise of temperature of the stator.

3. Sealing adhesive protection. Along with the advance of the sealing adhesive, the stator can be sealed without using any cover body. After the stator is covered by a mold, the adhesive is directly filled or injected into the mold to seal the entire stator. After the adhesive is solidified, the mold is removed, whereby the stator is sealedly enclosed in the adhesive body. However, in practice, such protection still has some shortcomings. There are still the above problems existing in the sealing adhesive. Moreover, the affection of the injection pressure and injection temperature onto the electronic components must be taken into consideration. In addition, after injected, it is impossible to check whether the components are displaced due to the injection pressure.

4. Coating protection. By means of coating or vacuum coating, the adhesive is uniformly coated on the outer surfaces of the stator and other electronic components so as to achieve moistureproof and waterproof effect. However, in practice, such protection still has some shortcomings. The coating coated on the stator and other electronic components is quite thin and is likely to be damaged by alien article in the manufacturing process or during transfer. Moreover, the material of the stator and other electronic components will affect the surface adhesion of the coating or deteriorate the adhesion effect thereof. At high temperature, the coating may blister and damage.

SUMMARY OF THE INVENTION

It is therefore a primary object of the present invention to provide a protection structure and a stator module thereof and a fan thereof. The outer faces of the silicon steel sheet assembly are exposed to outer side without enlarging the gap between the rotor and the silicon steel sheet assembly. Therefore, the power performance of the motor will not be affected.

It is a further object of the present invention to provide the above protection structure and the stator module thereof and the fan thereof. The electronic components are free from the affection of thermal stress of the sealing adhesive so that the electronic components are prevented from being damaged.

It is still a further object of the present invention to provide the above protection structure and the stator module thereof and the fan thereof, in which the electronic components are isolated from humidity and salty fog. Moreover, the heat dissipation effect is better.

It is still a further object of the present invention to provide the above protection structure and the stator module thereof and the fan thereof, in which the welding precision is high and the sealing effect is excellent.

It is still a further object of the present invention to provide a manufacturing method in which laser welding is used so that the welding precision is high and the sealing effect is perfect. Also, the welding time is shortened and the thermal deformation is reduced.

It is still a further object of the present invention to provide the above manufacturing method in which laser welding is used so that the processing is speeded and it costs no time to wait for the solidification and the cost and price are lowered.

It is still a further object of the present invention to provide the above manufacturing method in which robotic arm is used to operate and move the laser device so that the complicated junction can be quickly welded.

To achieve the above and other objects, the protection structure of the present invention is applicable to a stator module having multiple splits. The protection structure includes: a first cover body disposed at one end of the stator module, the first cover body including multiple posts correspondingly connected with the splits; and a second cover body disposed at the other end of the stator module, the multiple posts extending from the first cover body to the second cover body, each of the posts having an extension end connected with the second cover body.

Alternatively, the protection structure of the present invention includes a first cover body disposed at one end of the stator module and a second cover body disposed at the other end of the stator module. The second cover body has multiple posts correspondingly connected with the splits.

The stator module of the present invention includes: a circuit board; an insulation support assembly; a silicon steel sheet assembly fitted with the insulation support assembly, the silicon steel sheet assembly including a first end, a second end, multiple outer faces formed between the first and second ends and multiple splits respectively formed between the adjacent outer faces to axially pass through the first and second ends; a winding assembly wound around the silicon steel sheet assembly and connected to the circuit board; and a protection structure including a first cover body disposed at the first end of the silicon steel sheet assembly. The first cover body includes multiple posts respectively correspondingly connected with the splits. The outer faces of the silicon steel sheet assembly are respectively disposed between the posts and exposed to outer side.

Alternatively, the stator module of the present invention includes: a circuit board; an insulation support assembly; a silicon steel sheet assembly fitted with the insulation support assembly, the silicon steel sheet assembly including a first end, a second end, multiple outer faces formed between the first and second ends and multiple splits respectively formed between the adjacent outer faces to axially pass through the first and second ends; a winding assembly wound around the silicon steel sheet assembly and connected to the circuit board; and a protection structure including a first cover body disposed at the first end of the silicon steel sheet assembly and a second cover body disposed at the second end of the silicon steel sheet assembly. The second cover body includes multiple posts respectively correspondingly connected with the splits. The outer faces of the silicon steel sheet assembly are respectively disposed between the posts and exposed to outer side.

The fan of the present invention includes: a base seat disposed at a center of a fan frame; a circuit board; an insulation support assembly; a silicon steel sheet assembly fitted with the insulation support assembly, the silicon steel sheet assembly including a first end, a second end, multiple outer faces formed between the first and second ends and multiple splits respectively formed between the adjacent outer faces to axially pass through the first and second ends; and a winding assembly wound around the silicon steel sheet assembly and connected to the circuit board; a rotor disposed in the fan frame corresponding to the outer faces of the silicon steel sheet assembly; and a protection structure including a first cover body disposed at the first end of the silicon steel sheet assembly. The first cover body includes multiple posts respectively correspondingly connected with the splits. The outer faces of the silicon steel sheet assembly are respectively disposed between the posts and exposed to outer side corresponding to the rotor.

Alternatively, the fan of the present invention includes: a base seat disposed at a center of a fan frame; a circuit board; an insulation support assembly; a silicon steel sheet assembly fitted with the insulation support assembly, the silicon steel sheet assembly including a first end, a second end, multiple outer faces formed between the first and second ends and multiple splits respectively formed between the adjacent outer faces to axially pass through the first and second ends; and a winding assembly wound around the silicon steel sheet assembly and connected to the circuit board; a rotor disposed in the fan frame corresponding to the outer faces of the silicon steel sheet assembly; and a protection structure including a first cover body disposed at the first end of the silicon steel sheet assembly and a second cover body disposed at the second end of the silicon steel sheet assembly. The second cover body includes multiple posts respectively correspondingly connected with the splits. The outer faces of the silicon steel sheet assembly are respectively disposed between the posts and exposed to outer side corresponding to the rotor.

The manufacturing method of the fan stator module of the present invention includes steps of: providing a stator module, the stator module including a silicon steel sheet assembly having a first end, a second end, multiple splits and multiple outer faces, the outer faces being formed between the adjacent splits; providing a first cover body to cover the first end of the silicon steel sheet assembly, the first cover body including multiple posts correspondingly inserted in the multiple splits, two sides of the posts respectively contacting two sides of the splits; providing a second cover body to cover the second end of the silicon steel sheet assembly, the posts of the first cover body extending to the second cover body; and using laser welding to weld the first cover body with the first end of the silicon steel sheet assembly weld two sides of the posts with two sides of the splits.

Alternatively, the manufacturing method of the fan stator module present invention includes steps of: providing a stator module, the stator module including a silicon steel sheet assembly having a first end, a second end, multiple splits and multiple outer faces, the outer faces being formed between the adjacent splits; providing a first cover body and a second cover body to respectively cover the first and second ends of the silicon steel sheet assembly, the second cover body including multiple posts each having an extension end extending to the first cover body and correspondingly inserted in the multiple splits, two sides of the posts respectively contacting two sides of the splits; and using laser welding to weld the first cover body with the first end of the silicon steel sheet assembly and the extension ends of the multiple posts and weld the second cover body with the second end of the silicon steel sheet assembly and weld two sides of the posts with two sides of the splits.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 15 is a flow chart of a second embodiment of the manufacturing method of the present invention;

DETAILED DESCRIPTION OF THE PREFERRED EMBODIMENTS

Figure 1:
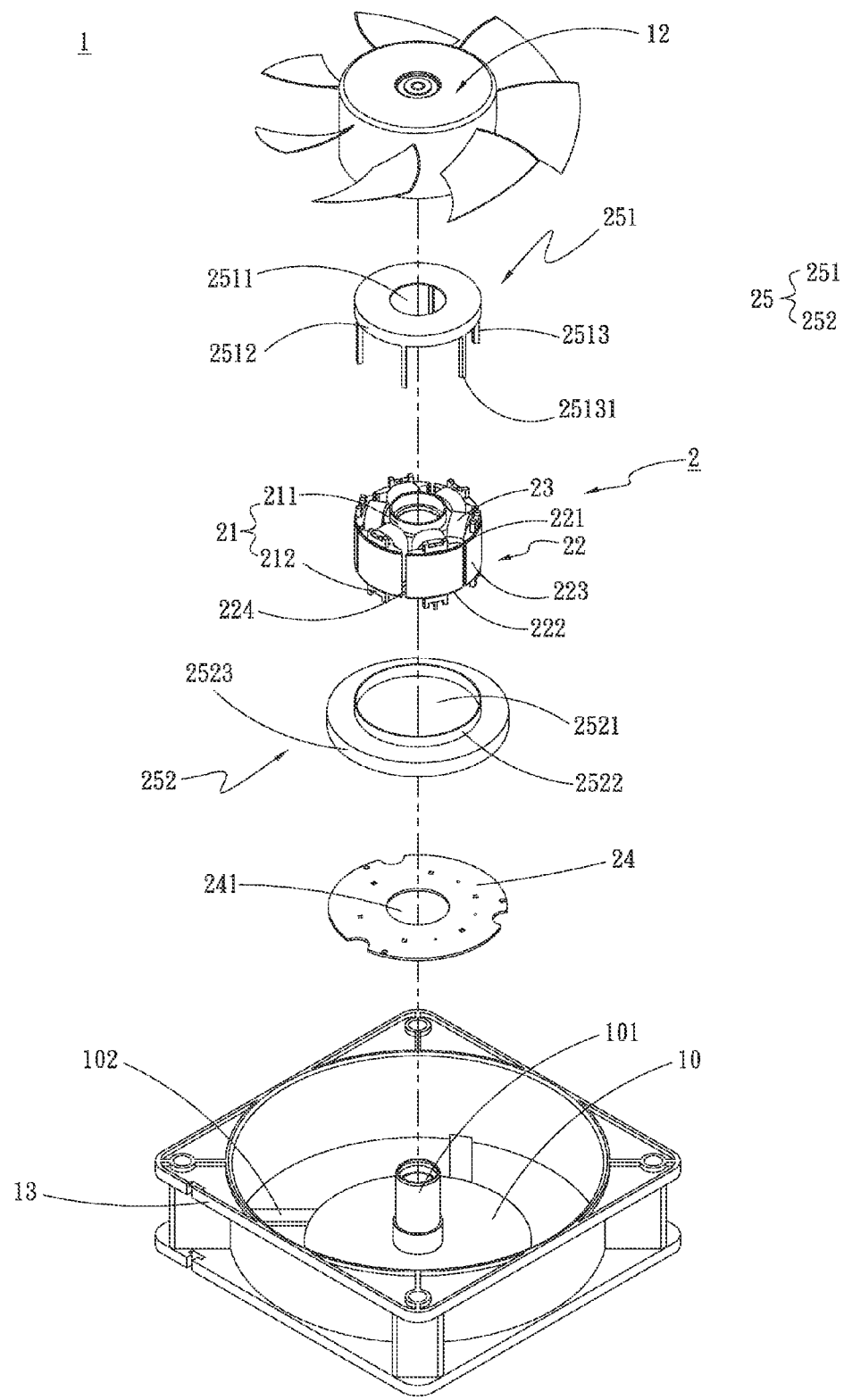
FIG. 1 is a perspective exploded view of a first embodiment of the structure of the present invention.
Figure 2:
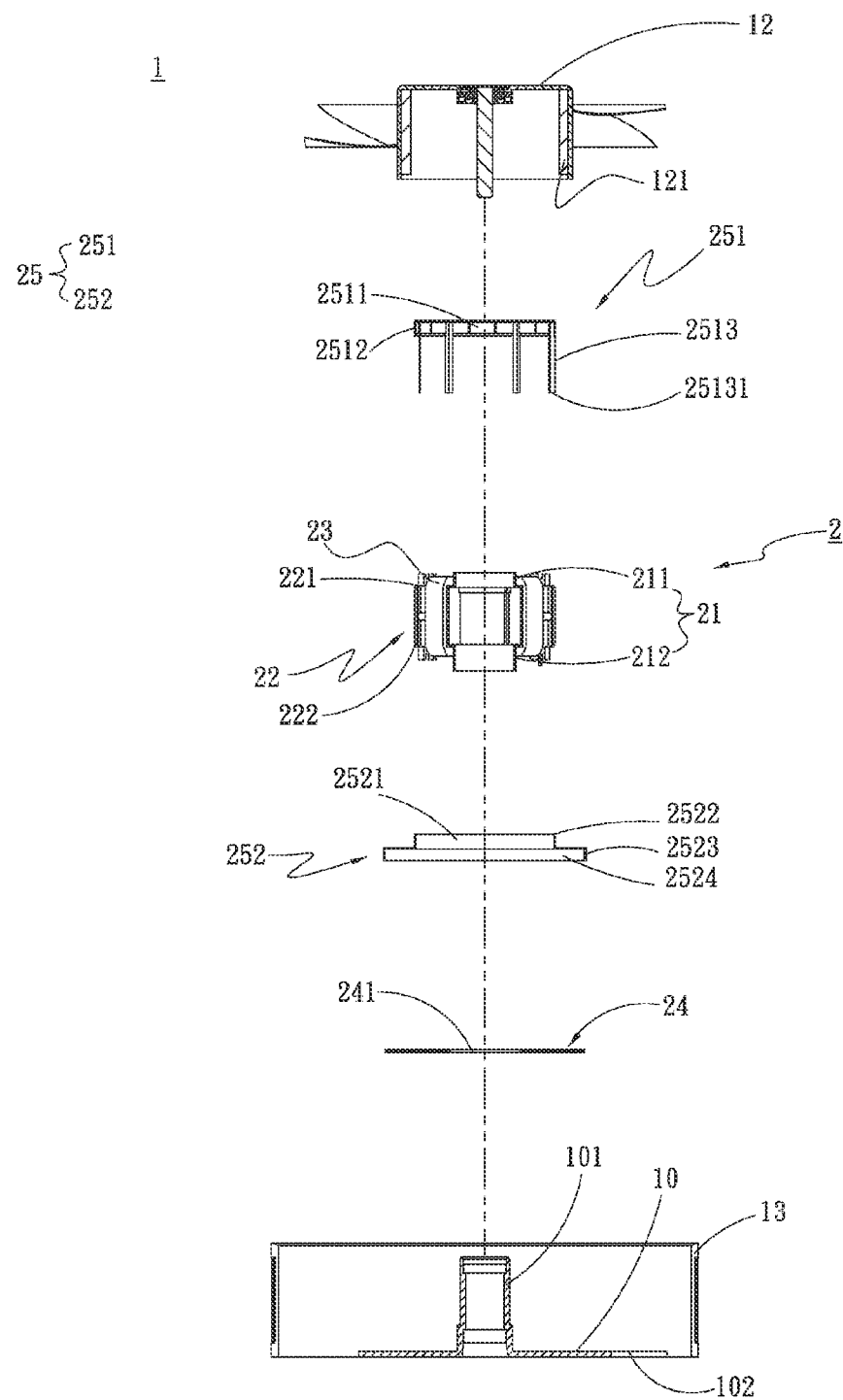
FIG. 2 is a sectional exploded view of the first embodiment of the structure of the present invention.
Figure 3:
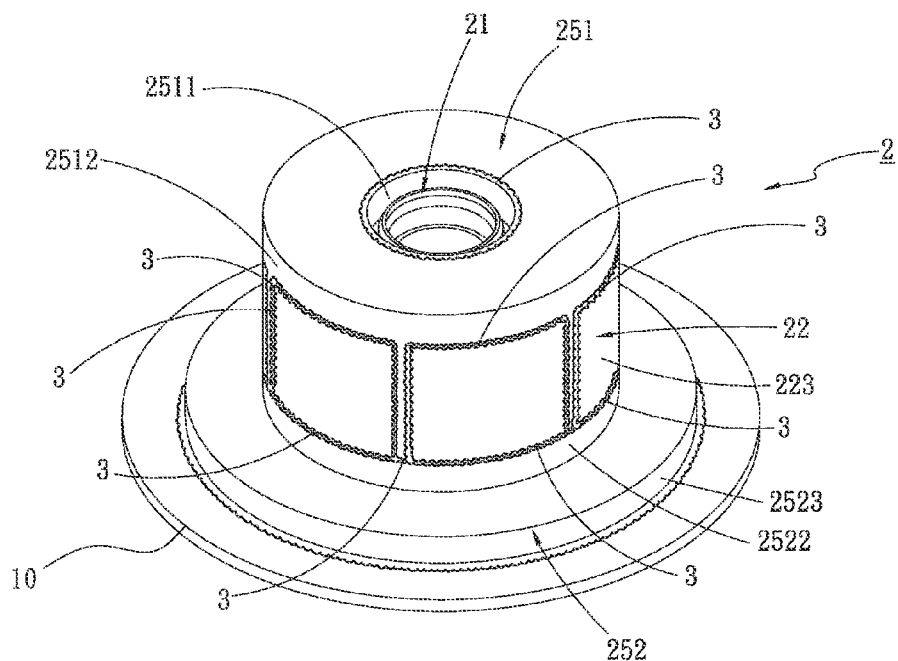
FIG. 3 is a perspective assembled view of the first embodiment of the structure of the present invention.
Figure 4:
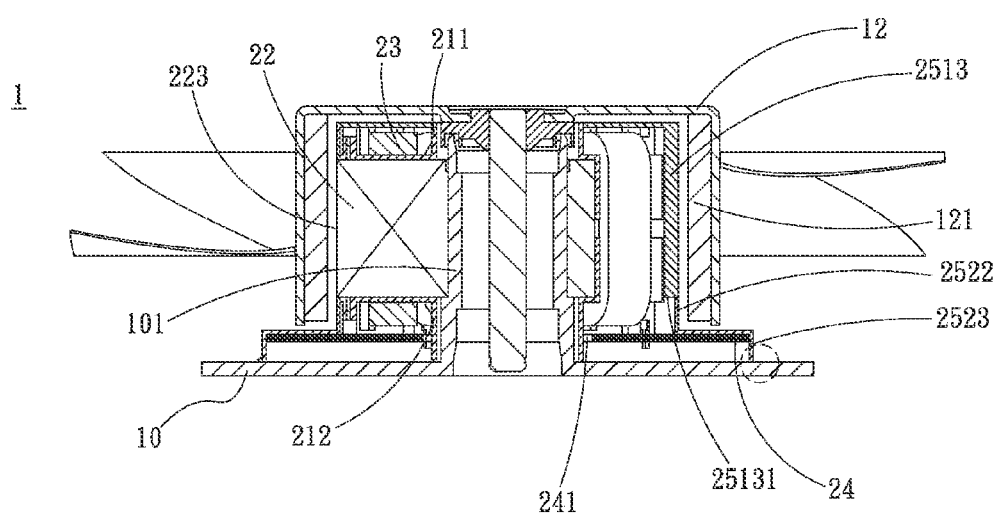
FIG. 4 is a sectional assembled view of the first embodiment of the structure of the present invention.
Figure 5:
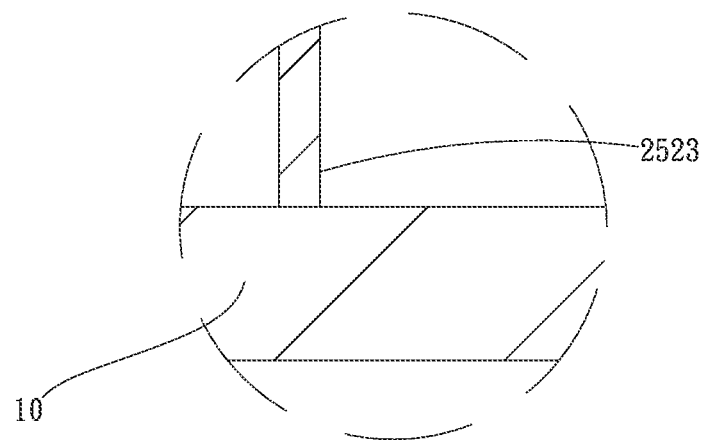
FIG. 5 is an enlarged view of circled area of FIG. 4.
Figure 6:
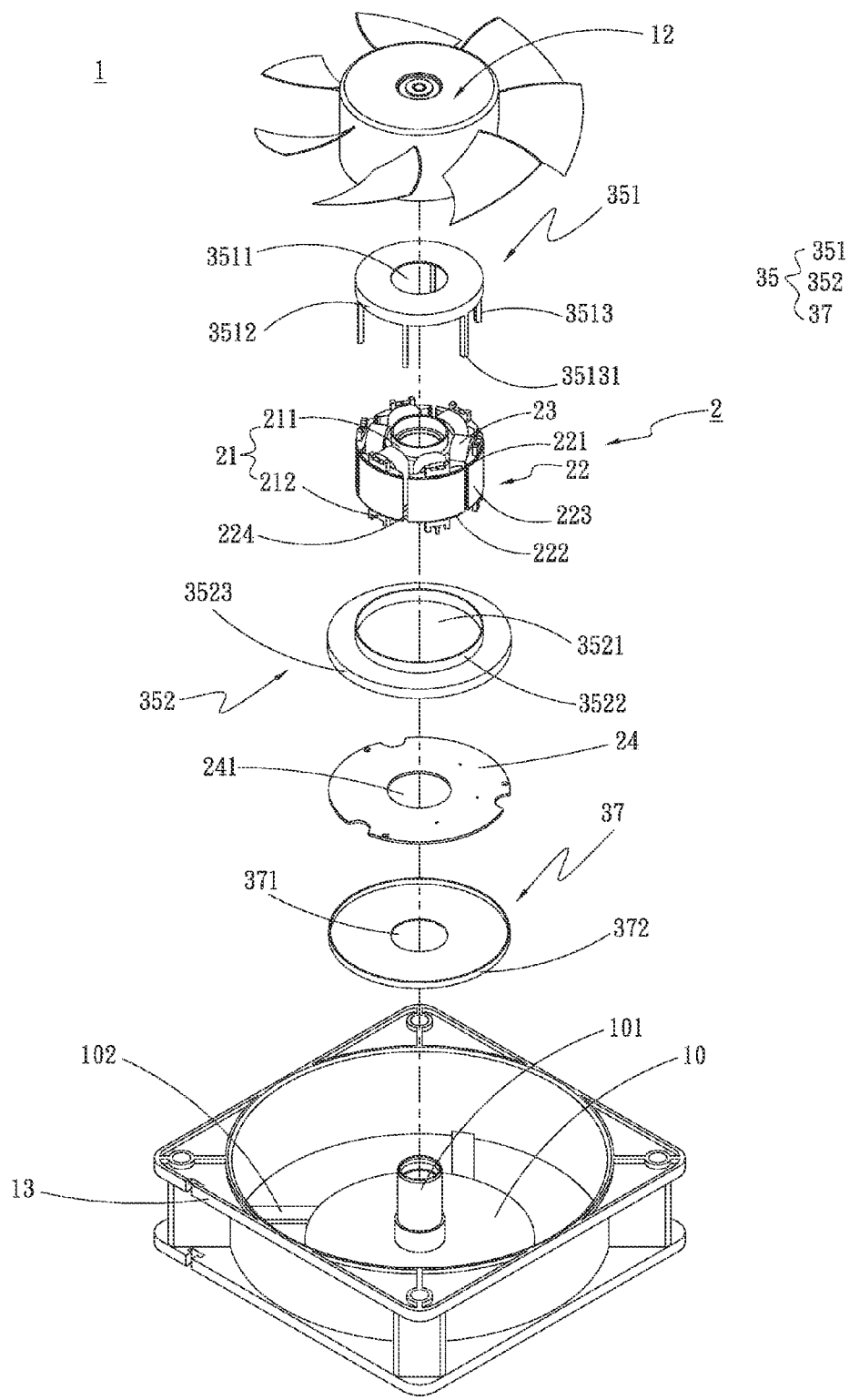
FIG. 6 is a perspective exploded view of a second embodiment of the structure of the present invention.

Please refer to FIGS. 1 and 2. FIG. 1 is a perspective exploded view of a first embodiment of the present invention. FIG. 2 is a sectional exploded view of the first embodiment of the present invention. According to the first embodiment, the fan 1 of the present invention includes a base seat 10, a stator module 2 and a rotor 12.

The base seat 10 includes a cup section 101 and multiple support sections 102. The cup section 101 axially upward protrudes from the base seat 10. The multiple support sections 102 are connected between an outer circumference of the base seat 10 and an inner circumference of a fan frame 13 for supporting the base seat 10 at the center of the fan frame 13.

Please now refer to FIGS. 1 to 5. The stator module 2 includes an insulation support assembly 21, a silicon steel sheet assembly 22, a winding assembly 23, a circuit board 24 and a protection structure 25.

The circuit board 24 is disposed on the base seat 10, having a central hole 241 in which the cup section 101 is fitted.

The insulation support assembly 21 includes an upper insulation support 211 and a lower insulation support 212.

The silicon steel sheet assembly 22 is composed of multiple silicon steel sheets, which are stacked. The silicon steel sheet assembly 22 is fitted between the insulation support assembly 21.

The silicon steel sheet assembly 22 has a first end 221 and a second end 222 and multiple outer faces 223 formed between the first and second ends 221, 222. Multiple splits 224 are formed between the adjacent outer faces 223 to axially pass through the first and second ends 221, 222.

The winding assembly 23 is wound around the silicon steel sheet assembly 22 and the insulation support assembly 21 and electrically connected to the circuit board 24.

The protection structure 25 includes a first cover body 251 and a second cover body 252, which are respectively disposed at two ends of the stator module 2.

The first cover body 251 is connected with the first end 221 of the silicon steel sheet assembly 22. The first cover body 251 has a first central hole 2511 formed at a center of the first cover body 251 and connected to the insulation support assembly 21. The first cover body 251 further has a first annular wall 2512 formed on an outer circumference of the first cover body 251 and connected with the first end 221 of the silicon steel sheet assembly 22. The first cover body 251 further has multiple posts 2513 arranged on the first annular wall 2512 at intervals and correspondingly connected in the splits 224 respectively. Each post 2513 has an extension end 25131 extending from the first cover body 251 to the second cover body 252. The outer faces 223 of the silicon steel sheet assembly 22 are respectively positioned between the posts 2513 and exposed to outer side.

The second cover body 252 is connected with the second end 222 of the silicon steel sheet assembly 22. The second cover body 252 has a second central hole 2521, a second annular wall 2522, a third annular wall 2523 and a receiving space 2524 (as shown in FIG. 2). The second annular wall 2522 is formed around the second central hole 2521 and connected with the second end 222 of the silicon steel sheet assembly 22 and the extension ends 25131 of the posts 2513 of the first cover body 251. The third annular wall 2523 is formed on an outer circumference of the second cover body 252 and connected with the base seat 10. The receiving space 2524 is formed between the second central hole 2521 and the third annular wall 2523 for receiving the circuit board 24.

The rotor 12 is disposed in the fan frame 13 corresponding to the stator module 2. The rotor 12 includes a magnetic member 121 corresponding to the outer faces 223 of the silicon steel sheet assembly 22 and the posts 2513.

As shown in FIGS. 2, 3, 4 and 5, by means of laser welding, the first annular wall 2512 is connected with the first end 221 of the silicon steel sheet assembly 22, the posts 2513 are connected with the splits 224, the first central hole 2511 is connected with the insulation support assembly 21, the extension ends 25131 of the posts 2513 are connected with the second annular wall 2522, the second annular wall 2522 is connected with the second end 222 of the silicon steel sheet assembly 22 and the third annular wall 2523 is connected with the base seat 10. A welding section 3 is formed at each junction between the connected sections after the laser welding.

Please now refer to FIGS. 6~9A and 9B, which show a second embodiment of the present invention. The second embodiment is partially identical to the first embodiment in structure and thus will not be repeatedly described hereinafter. The second embodiment is different from the first embodiment in that the protection structure 35 includes a first cover body 351, a second cover body 352 and a third cover body 37.

The first cover body 351 is connected with the first end 221 of the silicon steel sheet assembly 22. The first cover body 351 has a first central hole 3511 formed at the center of the first cover body 351 and connected with the insulation support assembly 21. The first cover body 351 further has a first annular wall 3512 formed on an outer circumference of the first cover body 351 and connected with the first end 221 of the silicon steel sheet assembly 22. The first cover body 351 further has multiple posts 3513 arranged on the first annular wall 2312 at intervals and correspondingly connected in the splits 224 respectively. The outer faces 223 of the silicon steel sheet assembly 22 are respectively positioned between the posts 3513 and exposed to outer side. Each post 3513 has an extension end 35131 extending from the first cover body 351 to the second cover body 352.

Figure 7:
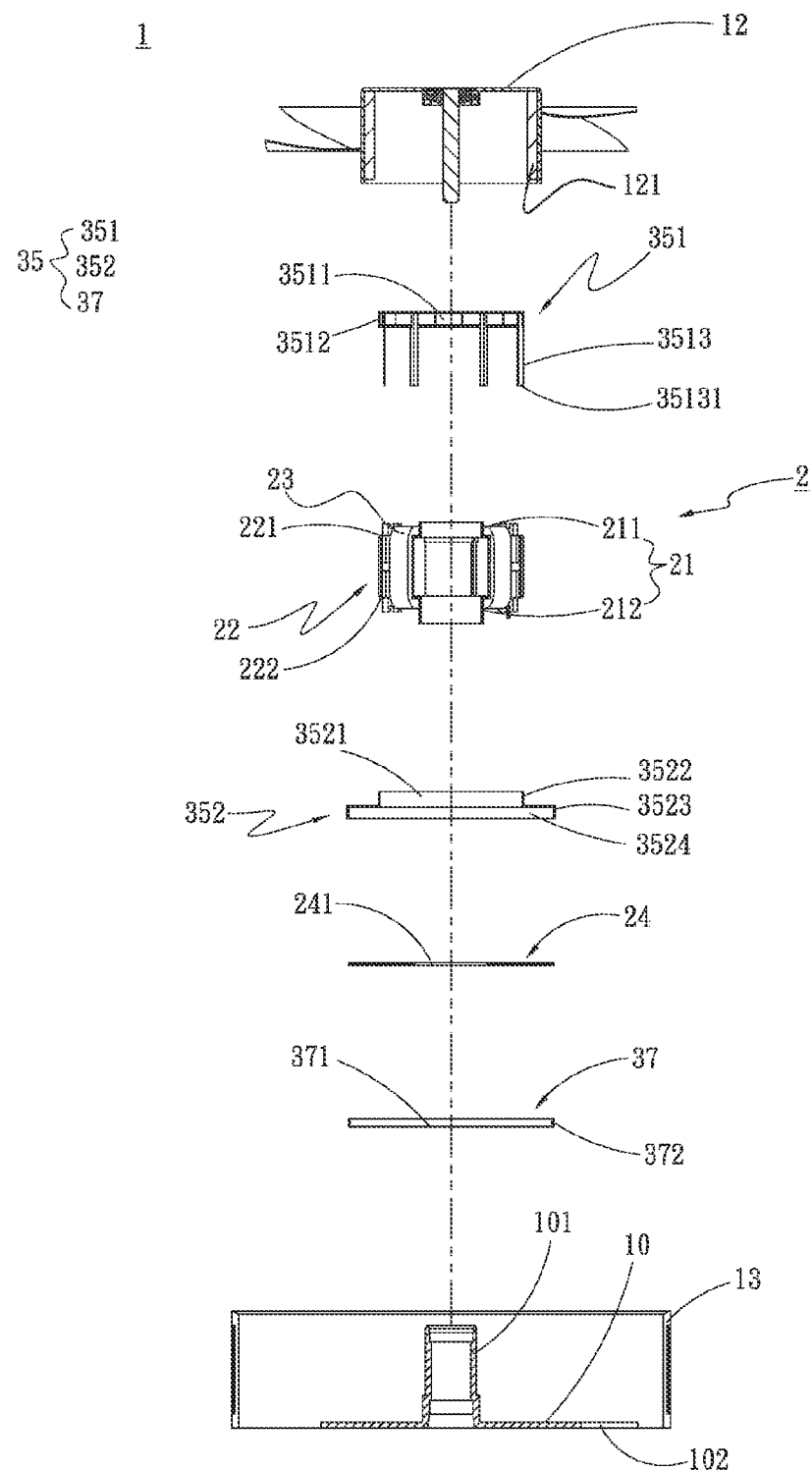
FIG. 7 is a sectional exploded view of the second embodiment of the structure of the present invention.

The second cover body 352 is connected with the second end 222 of the silicon steel sheet assembly 22. The second cover body 352 has a second central hole 3521, a second annular wall 3522, a third annular wall 3523 and a receiving space 3524 (as shown in FIG. 7). The second annular wall 3522 is formed around the second central hole 3521 and connected with the second end 222 of the silicon steel sheet assembly 22 and the extension ends 35131 of the posts 3513 of the first cover body 351. The third annular wall 3523 is formed on an outer circumference of the second cover body 352. The receiving space 3524 (as shown in FIG. 7) is formed between the second central hole 3521 and the third annular wall 3523.

The third cover body 37 is mated with the second cover body 352 and disposed on the base seat 10. The third cover body 37 has a third central hole 371 formed at the center of the third cover body 37 and a fourth annular wall 372 formed on an outer circumference of the third cover body 37. The third cover body 37 has a diameter slightly smaller than or slightly larger than or equal to the diameter of the second cover body 352, whereby the fourth annular wall 372 is mated with an inner circumference of the third annular wall 3523 or an outer circumference of the third annular wall 3523 or is directly mated with the third annular wall 3523.

Figure 8A:
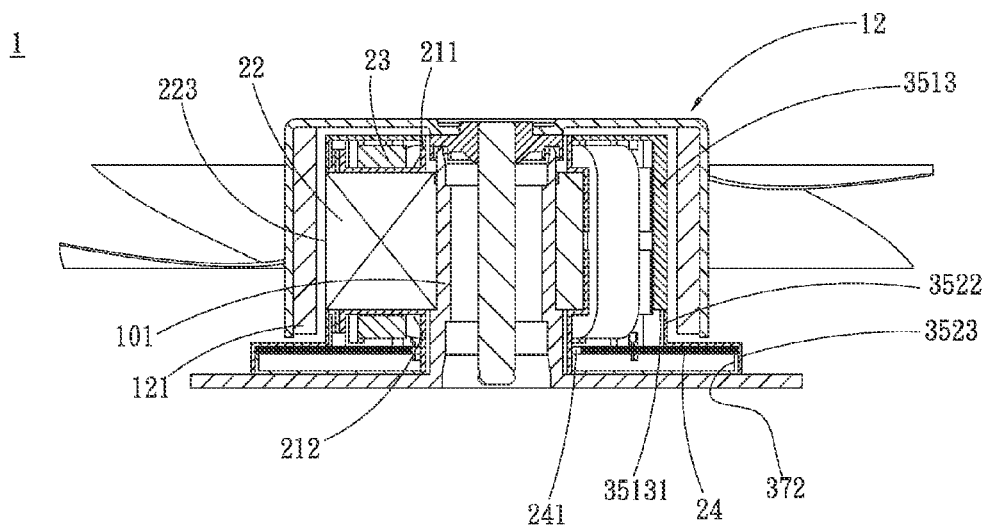
FIG. 8A is a sectional assembled view of the second embodiment of the structure of the present invention, in which the diameter of the third cover body is slightly smaller than the diameter of the second cover body.
Figure 8B:
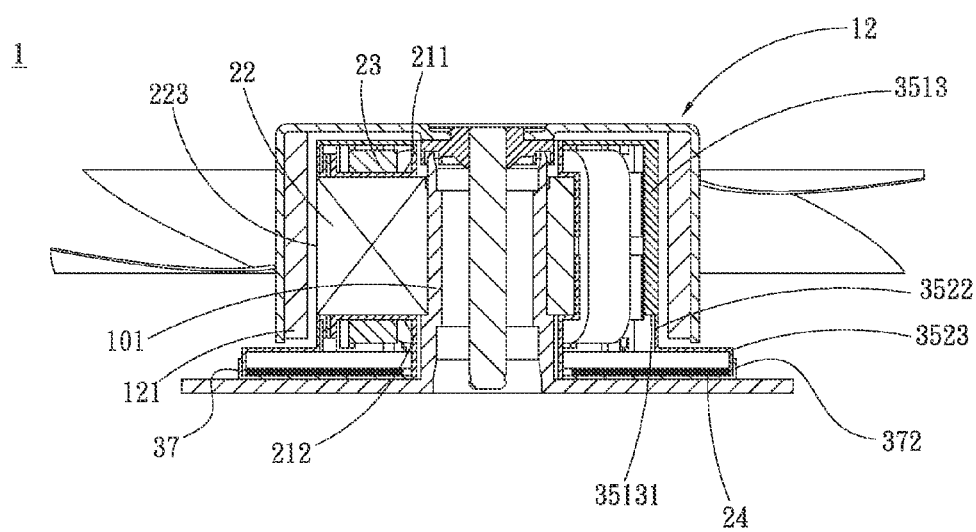
FIG. 8B is a sectional assembled view of the second embodiment of the structure of the present invention, in which the diameter of the third cover body is slightly larger than the diameter of the second cover body.
Figure 8C:
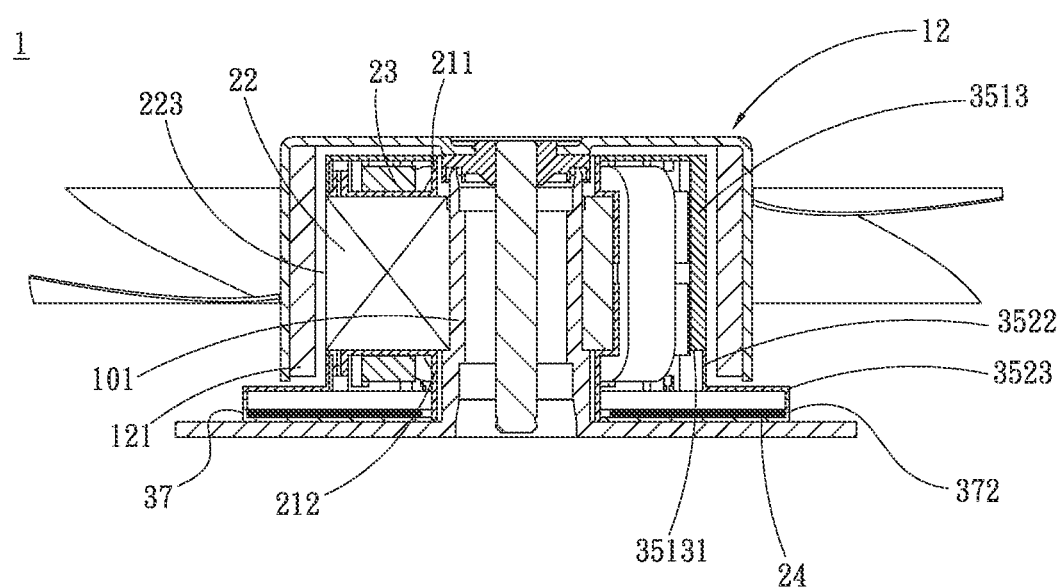
FIG. 8C is a sectional assembled view of the second embodiment of the structure of the present invention, in which the diameter of the third cover body is equal to the diameter of the second cover body.

As shown in FIGS. 7 and 8A, in this embodiment, the diameter of the third cover body 37 is smaller than the diameter of the second cover body 352 to press the circuit board 24 against the second cover body 352, whereby the circuit board 24 is located in the receiving space 3524 of the second cover body 352. The outer circumference of the fourth annular wall 372 is correspondingly connected with the inner circumference of the third annular wall 3523 so as to connect the second cover body 352 with the third cover body 37. The third central hole 371 is connected with the insulation support assembly 21. Alternatively, as shown in FIGS. 7 and 8B, the diameter of the third cover body 37 is larger than the diameter of the second cover body 352 and the circuit board 24 is disposed on the third cover body 37. The inner circumference of the fourth annular wall 372 is correspondingly connected with the outer circumference of the third annular wall 3523. Still alternatively, as shown in FIGS. 7 and 8C, the diameter of the third cover body 37 is equal to the diameter of the second cover body 352 and the circuit board 24 is disposed on the third cover body 37. The fourth annular wall 372 is mated with the third annular wall 3523 and the third central hole 371 is connected with the insulation support assembly 21.

According to the above arrangement, in this embodiment, the insulation support assembly 21, the silicon steel sheet assembly 22 and the winding assembly 23 of the stator module 2 are connected with the first and second cover bodies 351, 352. The circuit board 24 of the stator module 2 is disposed between the second and third cover bodies 352, 37.

Figure 9A:
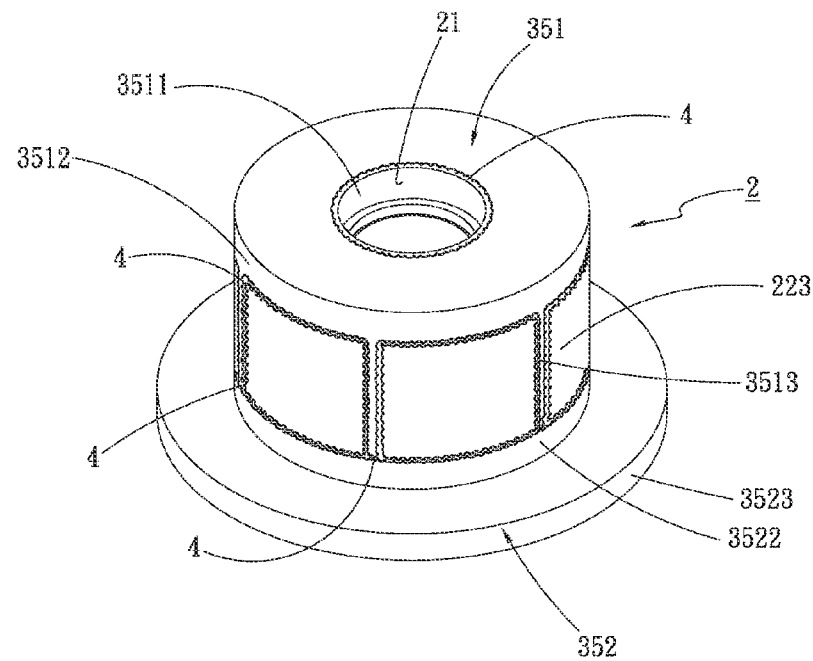
FIG. 9A is a perspective assembled view of the second embodiment of the structure of the present invention.
Figure 9B:
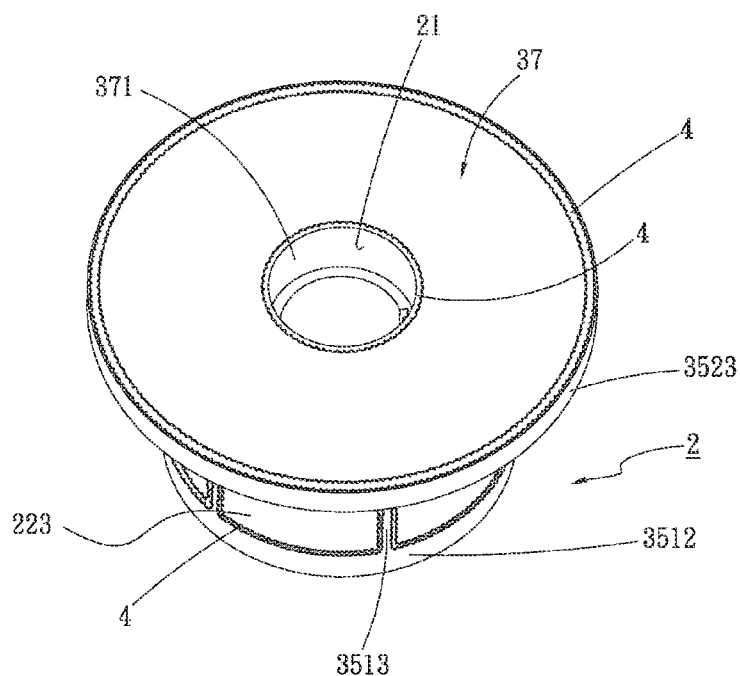
FIG. 9B is a perspective assembled view of the second embodiment of the structure of the present invention, seen from another angle.

As shown in FIGS. 9A and 9B, by means of laser welding, the first annular wall 3512 is connected with the first end 221 of the silicon steel sheet assembly 22, the posts 3513 are connected with the splits 224, the first central hole 3511 is connected with the insulation support assembly 21, the extension ends 35131 of the posts 3513 are connected with the second annular wall 3522, the second annular wall 3522 is connected with the second end 222 of the silicon steel sheet assembly 22, the third annular wall 3523 is connected with the third cover body 37 and the third cover body 37 is connected with the insulation support assembly 21. A welding section 4 is formed at each junction between the connected sections after the laser welding.

Please now refer to FIGS. 10-13A and 13B, which show a third embodiment of the present invention. The third embodiment is partially identical to the second embodiment in structure and assembly and thus will not be repeatedly described hereinafter. The third embodiment is different from the second embodiment in that the protection structure 45 includes a first cover body 451, a second cover body 452 and a third cover body 47.

The first cover body 451 is connected with the first end 221 of the silicon steel sheet assembly 22. The first cover body 451 has a first central hole 4511 formed at the center of the first cover body 451 and connected with the insulation support assembly 21. The first cover body 451 further has a first annular wall 4512 formed on an outer circumference of the first cover body 451 and connected with the first end 221 of the silicon steel sheet assembly 22.

Figure 11:
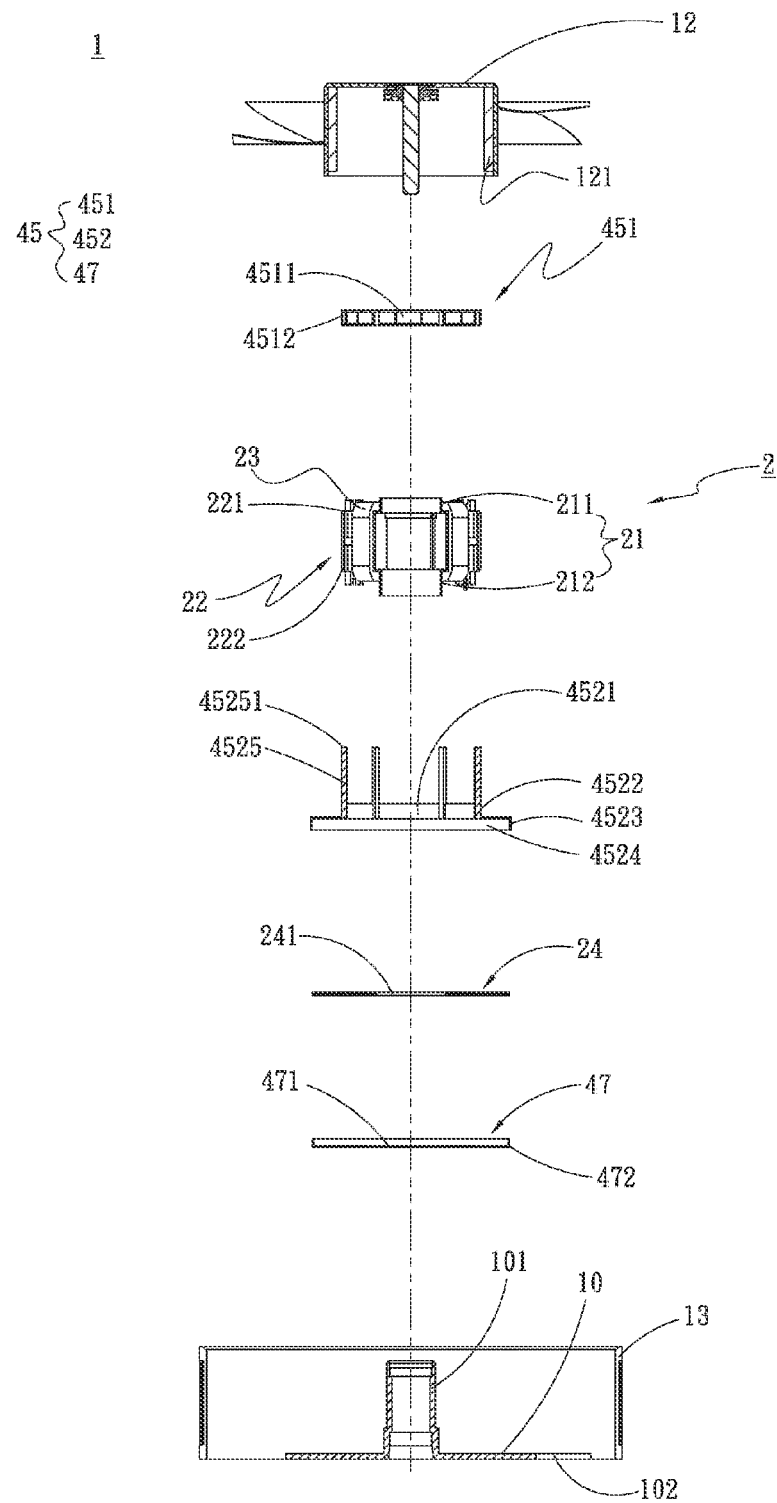
FIG. 11 is a sectional exploded view of the third embodiment of the structure of the present invention.

The second cover body 452 is connected with the second end 222 of the silicon steel sheet assembly 22. The second cover body 452 has a second central hole 4521, a second annular wall 4522, a third annular wall 4523, a receiving space 4524 (as shown in FIG. 11) and multiple posts 4525.

The second annular wall 4522 is formed around the second central hole 4521 and connected with the second end 222 of the silicon steel sheet assembly 22. The third annular wall 4523 is formed on an outer circumference of the second cover body 452. The receiving space 4524 is formed between the second central hole 4521 and the third annular wall 4523 for receiving the circuit board 24.

The multiple posts 4524 are arranged on the second annular wall 2312 at intervals and correspondingly connected in the splits 224 respectively. Each post 4524 has an extension end 45251 extending from the second cover body 452 to the first cover body 451 and connected with the first annular wall 4512 of the first cover body 451. The outer faces 223 of the silicon steel sheet assembly 22 are respectively positioned between the posts 4525 and exposed to outer side.

The third cover body 47 is mated with the second cover body 452. The third cover body 47 has a third central hole 471 formed at the center of the third cover body 47 and a fourth annular wall 472 formed on an outer circumference of the third cover body 47. The third cover body 47 has a diameter slightly smaller than or slightly larger than or equal to the diameter of the second cover body 452.

Figure 12:
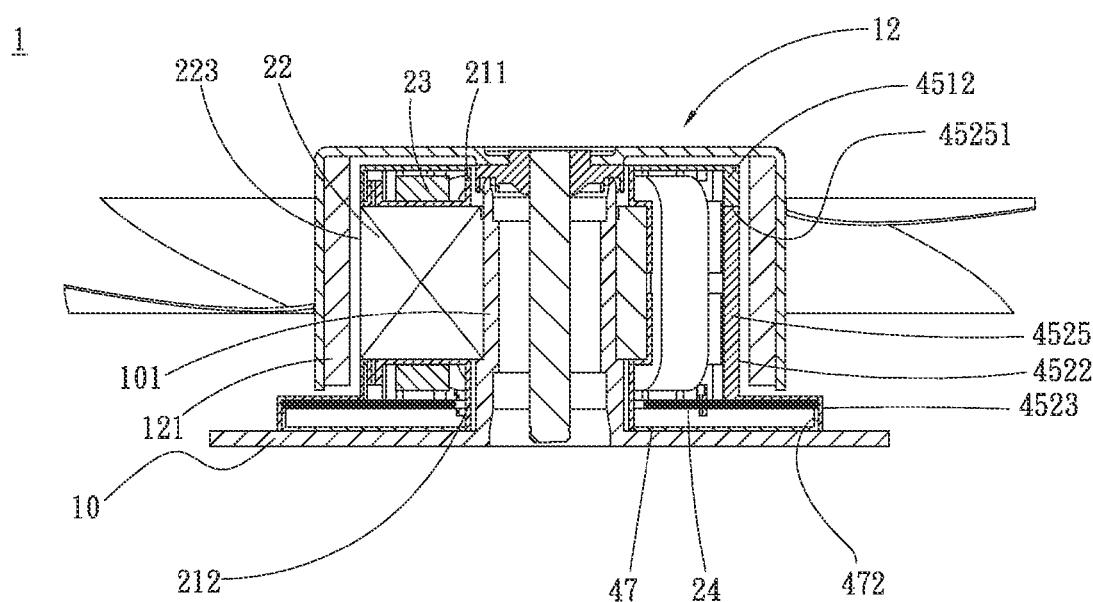
FIG. 12 is a sectional assembled view of the third embodiment of the structure of the present invention.

As shown in FIG. 12, in this embodiment, the diameter of the third cover body 47 is smaller than the diameter of the second cover body 452 to press the circuit board 24 against the second cover body 452, whereby the circuit board 24 is located in the receiving space 4524 of the second cover body 452. The outer circumference of the fourth annular wall 472 is correspondingly connected with the inner circumference of the third annular wall 4523 so as to connect the second cover body 452 with the third cover body 47. The third central hole 471 is connected with the insulation support assembly 21.

According to the above arrangement, in this embodiment, the insulation support assembly 21, the silicon steel sheet assembly 22 and the winding assembly 23 of the stator module 2 are connected with the first and second cover bodies 451, 452. The circuit board 24 of the stator module 2 is disposed between the second and third cover bodies 452, 47.

Figure 10:
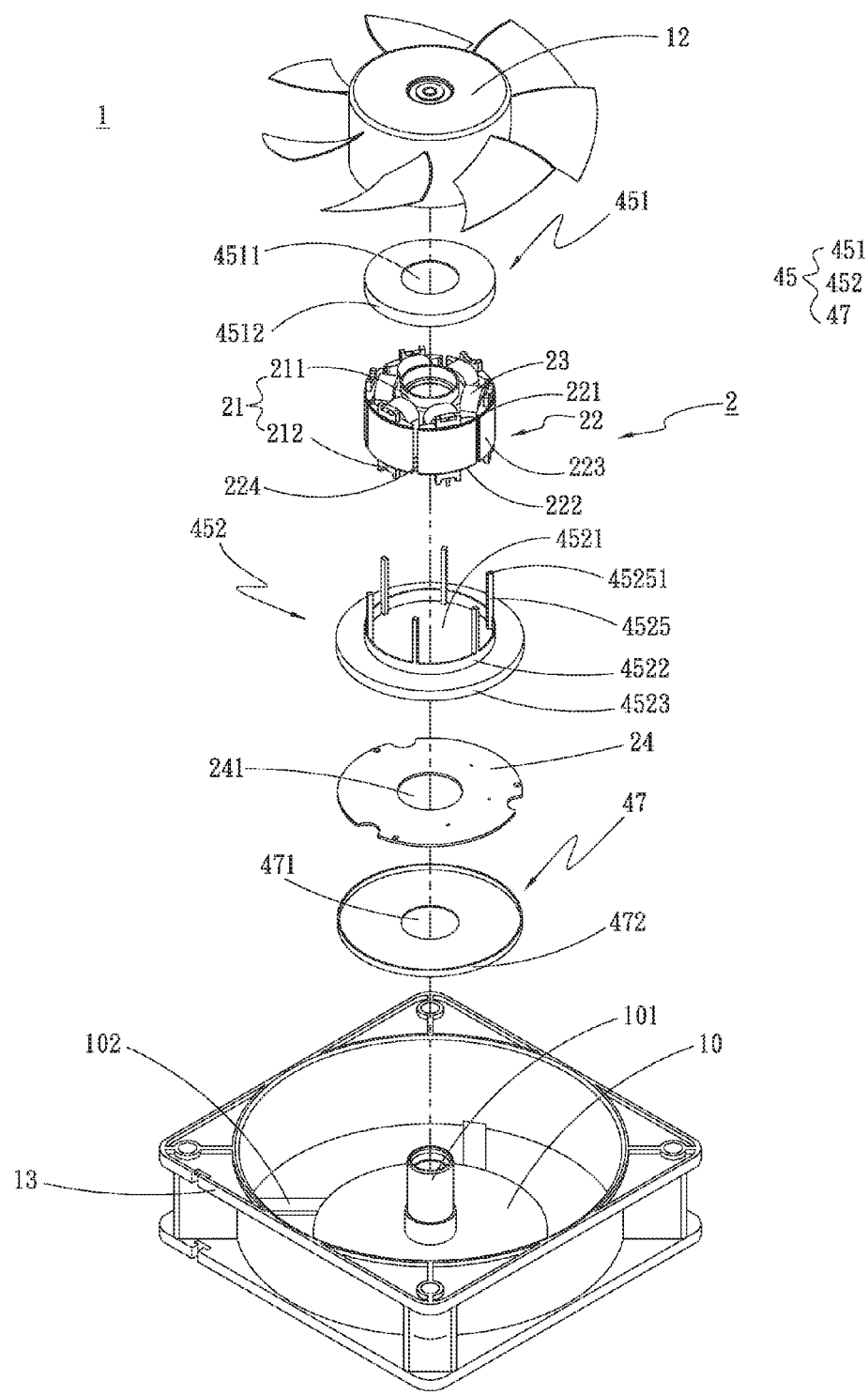
FIG. 10 is a perspective exploded view of a third embodiment of the structure of the present invention.
Figure 13A:
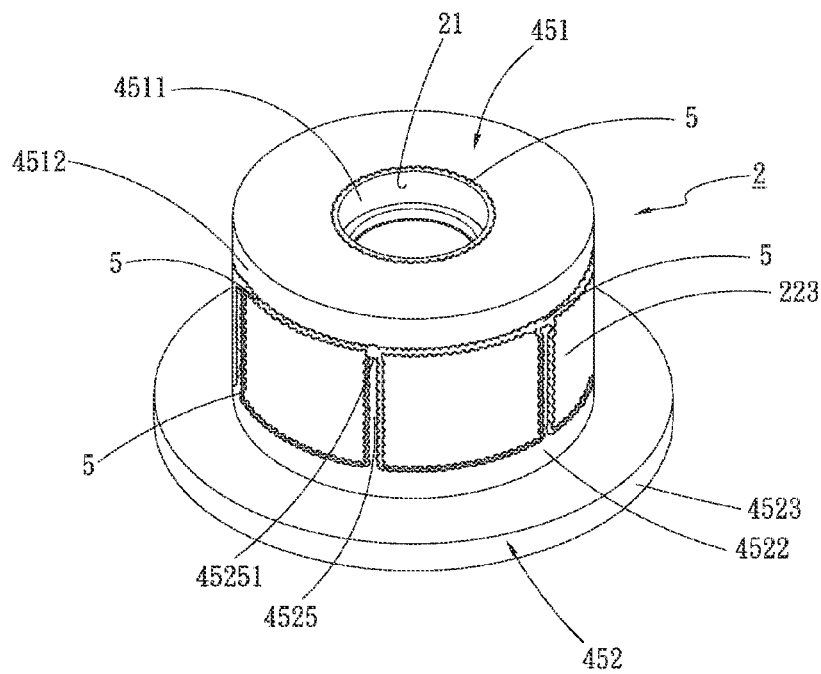
FIG. 13A is a perspective assembled view of the third embodiment of the structure of the present invention.
Figure 13B:
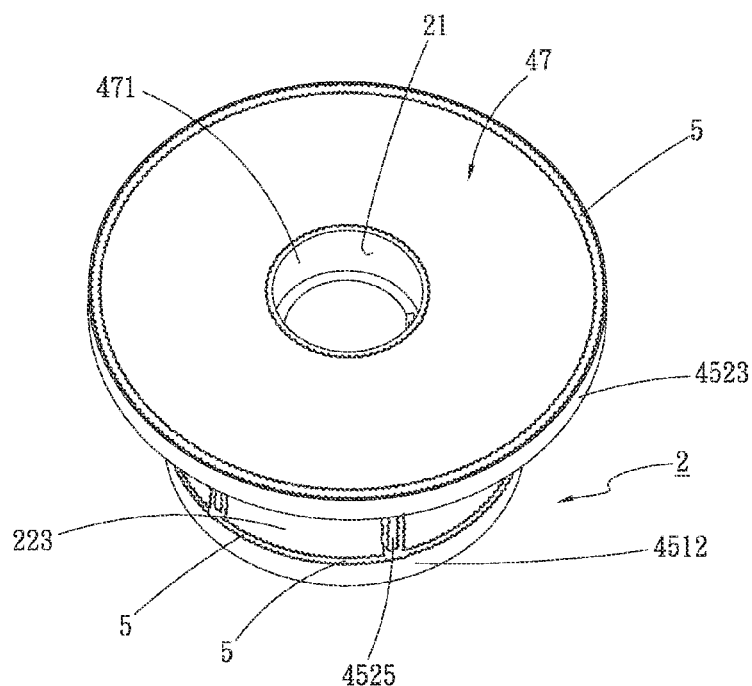
FIG. 13B is a perspective assembled view of the third embodiment of the structure of the present invention, seen from another angle.

As shown in FIGS. 10, 13A and 13B, by means of laser welding, the first annular wall 4512 is connected with the first end 221 of the silicon steel sheet assembly 22, the first central hole 4511 is connected with the insulation support assembly 21, the second annular wall 4522 is connected with the second end 222 of the silicon steel sheet assembly 22, the posts 4525 are connected with the splits 224, the extension ends 45251 of the posts 4525 are connected with the first annular wall 4512, the third annular wall 4523 is connected with the third cover body 47 and the third cover body 47 is connected with the insulation support assembly 21. A welding section 5 is formed at each junction between the connected sections after the laser welding. According to the above arrangements of the first, second and third embodiments, the present invention has the following advantages:

1. The outer faces of the silicon steel sheet assembly are exposed to outer side without enlarging the gap between the rotor and the stator module. Therefore, the power performance of the motor will not be affected.
2. There is no thermal stress of the sealing adhesive so that the electronic components are prevented from being damaged.
3. The welding precision is high and the sealing effect is excellent so that the electronic components are isolated from humidity and salty fog. Moreover, the heat dissipation effect is better.

Figure 14:
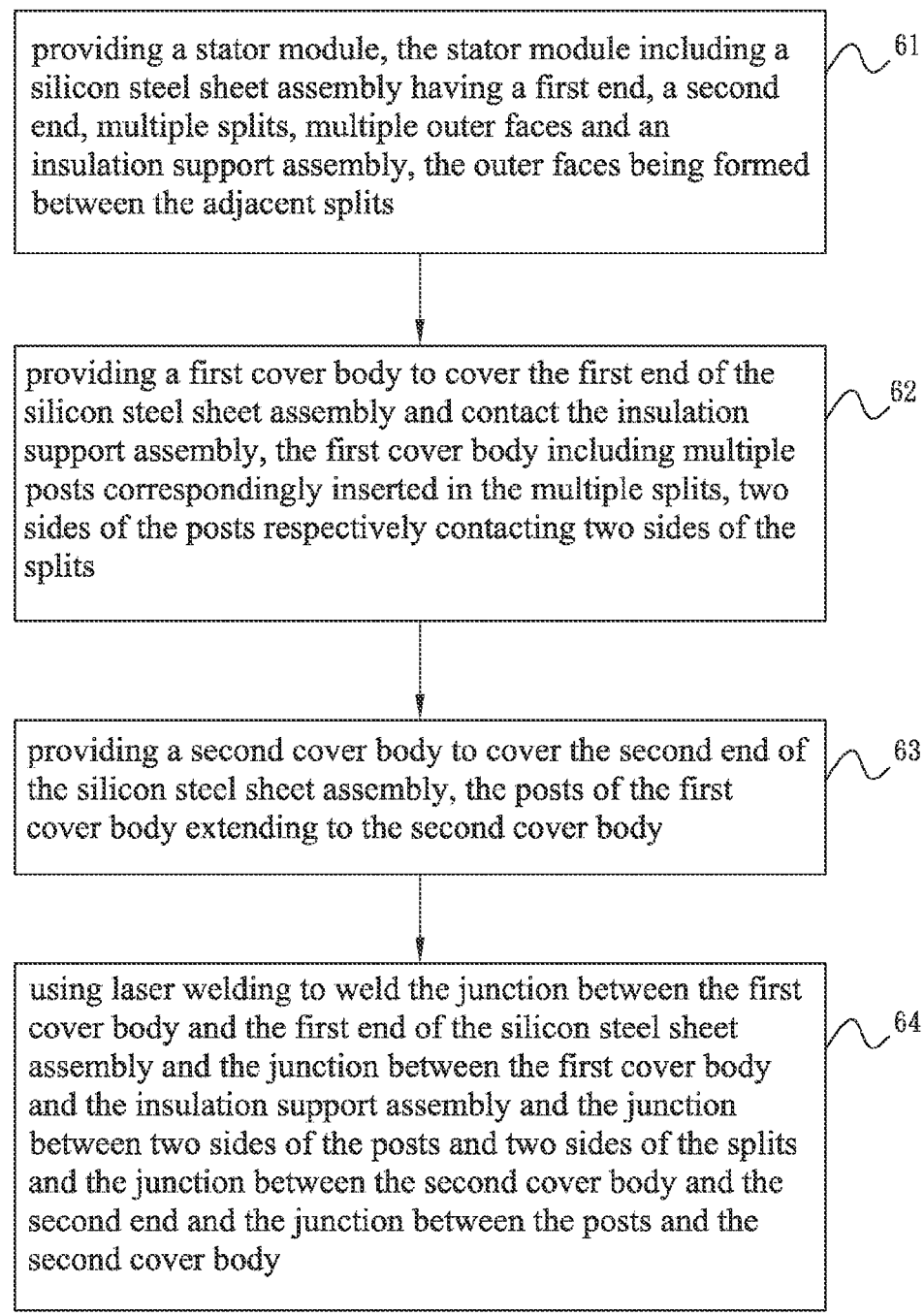
FIG. 14 is a flow chart of a first embodiment of the manufacturing method of the present invention.

Please now refer to FIG. 14, which is a flow chart of a first embodiment of the manufacturing method of the present invention that is applied to the first embodiment of the fan of the present invention. With reference to the description of the first embodiment of the fan of the present invention, the first embodiment of the manufacturing method of the present invention includes steps of:

61. providing a stator module 2, the stator module 2 including a silicon steel sheet assembly 22 having a first end 221, a second end 222, multiple splits 224, multiple outer faces 223 and an insulation support assembly 21, the outer faces 223 being formed between the adjacent splits 224;
62. providing a first cover body 251 to cover the first end 221 of the silicon steel sheet assembly 22 and contact the insulation support assembly 21, the first cover body 251 including multiple posts 2513 correspondingly inserted in the multiple splits 224, two sides of the posts 2513 respectively contacting two sides of the splits 224;
63. providing a second cover body 252 to cover the second end 222 of the silicon steel sheet assembly 22, the posts 2513 of the first cover body 251 extending to the second cover body 252; and
64. using laser welding to weld the junction between the first cover body 251 and the first end 221 of the silicon steel sheet assembly 22 and the junction between the first cover body 251 and the insulation support assembly 21 and the junction between two sides of the posts 2513 and two sides of the splits 224 and the junction between the second cover body 252 and the second end 222 and the junction between the posts 2513 and the second cover body 252.

Please now refer to FIG. 15, which is a flow chart of a second embodiment of the manufacturing method of the present invention that is applied to the second embodiment of the fan of the present invention. The second embodiment is partially identical to the first embodiment and thus will not be repeatedly described hereinafter. With reference to the description of the second embodiment of the fan of the present invention, the second embodiment is different from the first embodiment in that the second embodiment of the manufacturing method of the present invention includes steps of:

71. providing a stator module 2, the stator module 2 including a silicon steel sheet assembly 22 having a first end 221, a second end 222, multiple splits 224, multiple outer faces 223 and an insulation support assembly 21, the outer faces 223 being formed between the adjacent splits 224;
72. providing a first cover body 351 to cover the first end 221 of the silicon steel sheet assembly 22 and contact the insulation support assembly 21, the first cover body 351 including multiple posts 3513 correspondingly inserted in the multiple splits 224, two sides of the posts 2513 respectively contacting two sides of the splits 224;
73. providing a second cover body 352 to cover the second end 222 of the silicon steel sheet assembly 22, the posts 3513 extending to the second cover body 252, a third cover body 37 being further provided corresponding to the second cover body 352 in contact with the insulation support assembly 21; and
74. using laser welding to weld the junction between the first cover body 351 and the first end 221 of the silicon steel sheet assembly 22 and the junction between the first cover body 351 and the insulation support assembly 21 and the junction between two sides of the posts 3513 and two sides of the splits 224 and the junction between the second cover body 352 and the second end 222 and the junction between the posts 3513 and the second cover body 352 and the junction between the third cover body 37 and the second cover body 352 and the junction between the third cover body 37 and the insulation support assembly 21.

Figure 16A:
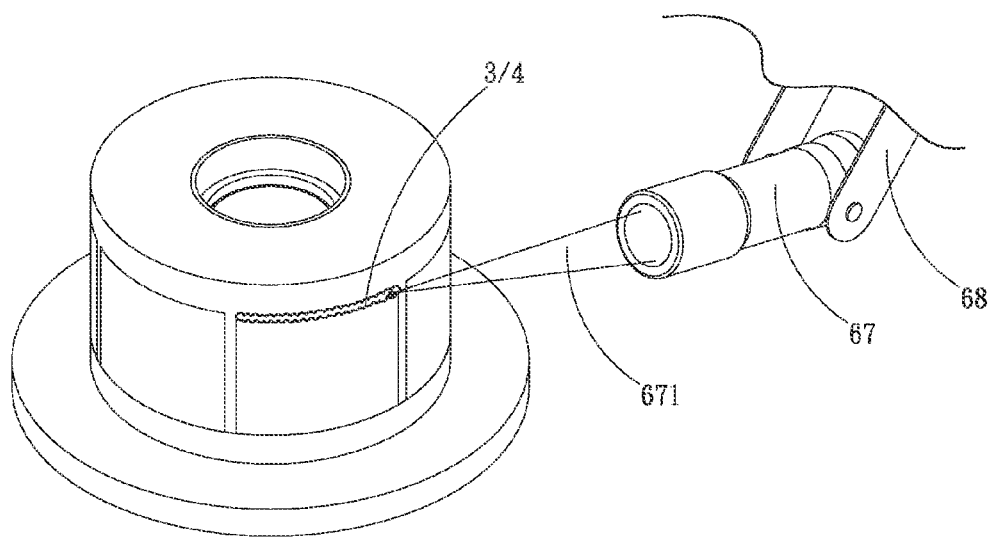
FIGS. 16A and 16B are perspective views showing the step of laser welding of the present invention.
Figure 16B:
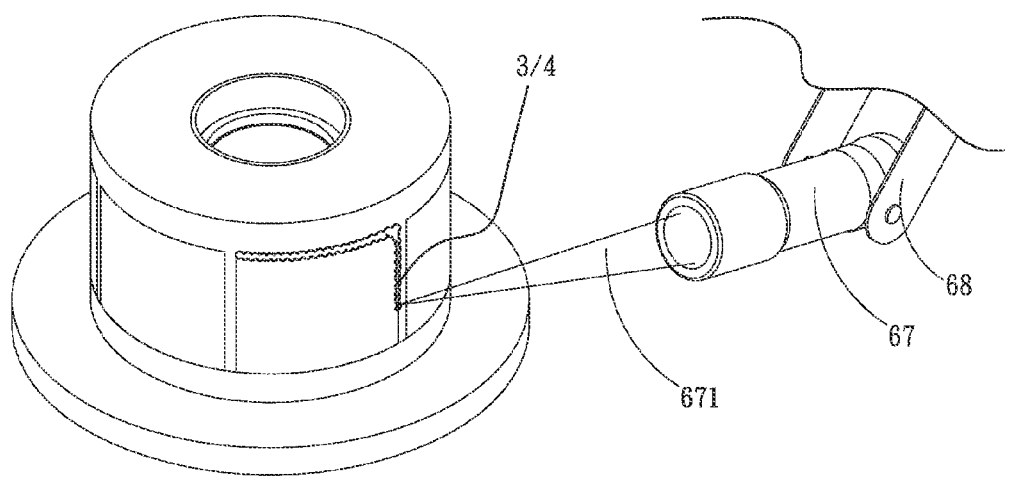

Please refer to FIGS. 16A and 16B. Also referring to the description of the first and second embodiments of the fan of the present invention, in the step of laser welding of the manufacturing method of the present invention, a laser device 67 is used to continuously generate and project a laser beam 671 onto the surface of the junctions. The laser device is, but not limited to, gas $CO_2$ laser device or solid YAG laser device. The laser welding of the present invention is, but not limited to, laser heat transfer welding or laser deep penetration welding.

With respect to laser heat transfer welding, the objects to be connected are molten in the welding process. The laser beam is absorbed by the seams on the surfaces of the objects and then the molten objects are solidified to connect with each other. In such welding process, the welding depth is generally smaller than 2 mm.

With respect to laser deep penetration welding, the laser is activated at a power density of about 106 watts per cubic millimeter. The objects to be connected are locally heated to an evaporation temperature, whereby vapor capillary is formed inside the objects. The vapor pressure generated inside the objects produces a capillary with a size about 1.5 times the diameter of the laser beam focus through the seams of the objects for welding the objects together. The liquid static pressure, the surface tension of the molten objects and the vapor pressure in the capillary are balanced to avoid crash of the capillary. In such welding process, the welding depth is up to 25 mm. The laser device 67 is connected to a robotic arm 68. By means of the robotic arm 68, the laser device 67 is moved along the junction between the objects.

The laser deep penetration welding will be exemplified hereinafter for illustrating the laser welding process. The laser has sufficiently high power thermal density so that when the laser beam 671 is projected onto the surfaces of the junctions, the laser beam can be conducted into the junction between the adjacent objects to form capillary inside the junction. When the laser beam 671 moves along the junction, the capillary is also moved along with the laser beam 671, whereby the material of the junction is molten to connect with each other to form a welding section 3 or 4 at the junction.

Figure 17:
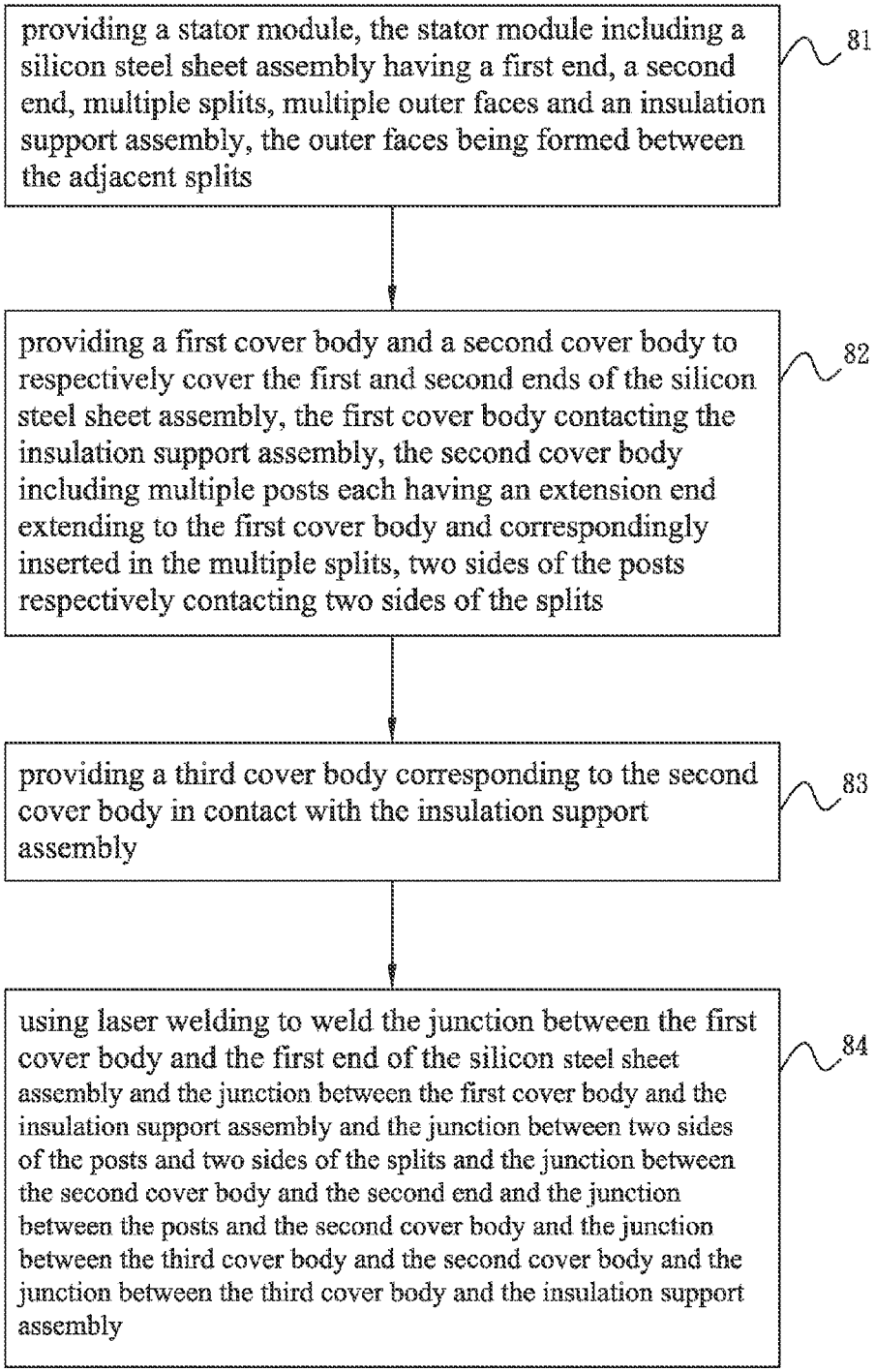
FIG. 17 is a flow chart of a third embodiment of the manufacturing method of the present invention.

Please now refer to FIG. 17, which is a flow chart of a third embodiment of the manufacturing method of the present invention that is applied to the third embodiment of the fan of the present invention. The third embodiment is partially identical to the first embodiment in laser welding principle and thus will not be repeatedly described hereinafter. The third embodiment is different from the first embodiment in that the third embodiment of the manufacturing method of the present invention includes steps of:

providing a stator module 2, the stator module 2 including a silicon steel sheet assembly 22 having a first end 221, a second end 222, multiple splits 224, multiple outer faces 223 and an insulation support assembly 21, the outer faces 223 being formed between the adjacent splits 224;

providing a first cover body 451 and a second cover body 452 to respectively cover the first and second ends 221, 222 of the silicon steel sheet assembly 22, the first cover body 451 contacting the insulation support assembly 21, the second cover body 452 including multiple posts 4525 each having an extension end 45251 extending to the first cover body 451 and correspondingly inserted in the multiple splits 224, two sides of the posts 4525 respectively contacting two sides of the splits 224;

providing a third cover body 47 corresponding to the second cover body 452 in contact with the insulation support assembly 21; and using laser welding to weld the junction between the first cover body 451 and the first end 221 of the silicon steel sheet assembly 22 and the junction between the first cover body 451 and the insulation support assembly 21 and the junction between two sides of the posts 45251 and two sides of the splits 224 and the junction between the second cover body 452 and the second end 222 and the junction between the posts 4525 and the second cover body 452 and the junction between the third cover body 47 and the second cover body 452 and the junction between the third cover body 47 and the insulation support assembly 21.

According to the first to third embodiments of the manufacturing method of the present invention, the present invention has the following advantages:

1. The welding precision is high and the sealing effect is perfect. Also, the welding time is short and the thermal deformation is reduced.
2. The processing is speeded and it costs no time to wait for the solidification. In addition, the cost and price are lower.
3. The complicated junction can be quickly welded.

The present invention has been described with the above embodiments thereof and it is understood that many changes and modifications in the above embodiments can be carried out without departing from the scope and the spirit of the invention that is intended to be limited only by the appended claims.

What is claimed is:

1. A manufacturing method of a stator module of a fan, comprising steps of:
    providing a stator module, the stator module including a silicon steel sheet assembly having a first end, a second end, multiple splits, multiple outer faces and an insulation support assembly, the outer faces being formed between the adjacent splits;
    providing a first cover body of a protection structure to cover the first end of the silicon steel sheet assembly and contact the insulation support assembly, the first cover body including multiple posts correspondingly inserted in the multiple splits, two sides of the posts respectively contacting two sides of the outer faces;
    providing a second cover body of the protection structure to cover the second end of the silicon steel sheet assembly, the posts of the first cover body extending to the second cover body the outer faces contacting the first cover body, the second cover body and the posts; and
    using laser welding to weld the junction between the first cover body and the outer faces, the junction between the first cover body and the insulation support assembly, the junction between two sides of the posts and two sides of the outer faces, and the junction between the second cover body and the outer faces and the junction between the posts and the second cover body thereby creating a continuous outer structure.

2. The manufacturing method as claimed in claim 1, further comprising a step of providing a third cover body corresponding to the second cover body in contact with the insulation support assembly before the step of laser welding, laser welding being used to weld the junction between the third cover body and the second cover body and the junction between the third cover body and the insulation support assembly.

3. The manufacturing method as claimed in claim 2, wherein in the step of laser welding, a laser beam is generated.

4. The manufacturing method as claimed in claim 3, wherein in the step of laser welding, the laser welding is operated and moved by means of a robotic arm.

5. A manufacturing method of a stator module of a fan, comprising steps of:
    providing a stator module, the stator module including a silicon steel sheet assembly having a first end, a second end, multiple splits, multiple outer faces and an insulation support assembly, the outer faces being formed between the adjacent splits;
    providing a first cover body and a second cover body of a protection structure to respectively cover the first and second ends of the silicon steel sheet assembly, the first cover body contacting the insulation support assembly, the second cover body including multiple posts each having an extension end extending to the first cover body and correspondingly inserted in the multiple splits, two sides of the posts respectively contacting two sides of the outer faces; and using laser welding to weld the junction between the first cover body and the outer faces, the extension ends of the posts, the junction between the first cover body and the insulation support assembly, and the junction between the second cover body and the outer faces and the junction between two sides of the posts and two sides of the outer faces thereby creating a continuous outer structure.

6. The manufacturing method as claimed in claim 5, further comprising a step of providing a third cover body corresponding to the second cover body in contact with the insulation support assembly before the step of laser welding, laser welding being used to weld the junction between the third cover body and the second cover body and the junction between the third cover body and the insulation support assembly.

7. The manufacturing method as claimed in claim 6, wherein in the step of laser welding, a laser beam is generated.

8. The manufacturing method as claimed in claim 7, wherein in the step of laser welding, the laser welding is operated and moved by means of a robotic arm.

* * * * *